United States Patent [19]

Irons

[11] Patent Number: 5,352,966
[45] Date of Patent: Oct. 4, 1994

[54] BATTERY CHARGING DEVICE
[75] Inventor: James W. Irons, South Dartmouth, Mass.
[73] Assignee: Iron Chargers, Inc., New Bedford, Mass.
[21] Appl. No.: 943,926
[22] Filed: Sep. 11, 1992
[51] Int. Cl.⁵ .................... H01M 10/46; H02J 7/00
[52] U.S. Cl. .................................. 320/3; 320/15; 320/17; 340/636
[58] Field of Search ............... 320/3, 15, 17; 340/636

[56] References Cited
U.S. PATENT DOCUMENTS

| | | | |
|---|---|---|---|
| 2,675,490 | 4/1954 | Portail | 320/3 X |
| 4,300,087 | 11/1981 | Meisner | 320/2 |
| 4,692,680 | 9/1987 | Sherer | 320/3 X |
| 5,107,197 | 4/1992 | Arlinghaus | 320/15 |

Primary Examiner—R. J. Hickey
Attorney, Agent, or Firm—Robert F. O'Connell

[57] ABSTRACT

A battery charging device uses a primary battery source which is preferably a rechargeable lead acid battery, connected to a secondary battery source, which is preferably a pair of parallel battery circuits each using series-connected non-rechargeable batteries in series with a diode, the primary and secondary battery sources providing a charging voltage output. A switch has a first position in which the charging voltage output can be supplied to an external battery which is to be charged and a second position in which a recharging voltage can be supplied from an external source to recharge the primary battery source, and a third, or off, position in which charging and recharging operations cannot occur.

13 Claims, 1 Drawing Sheet

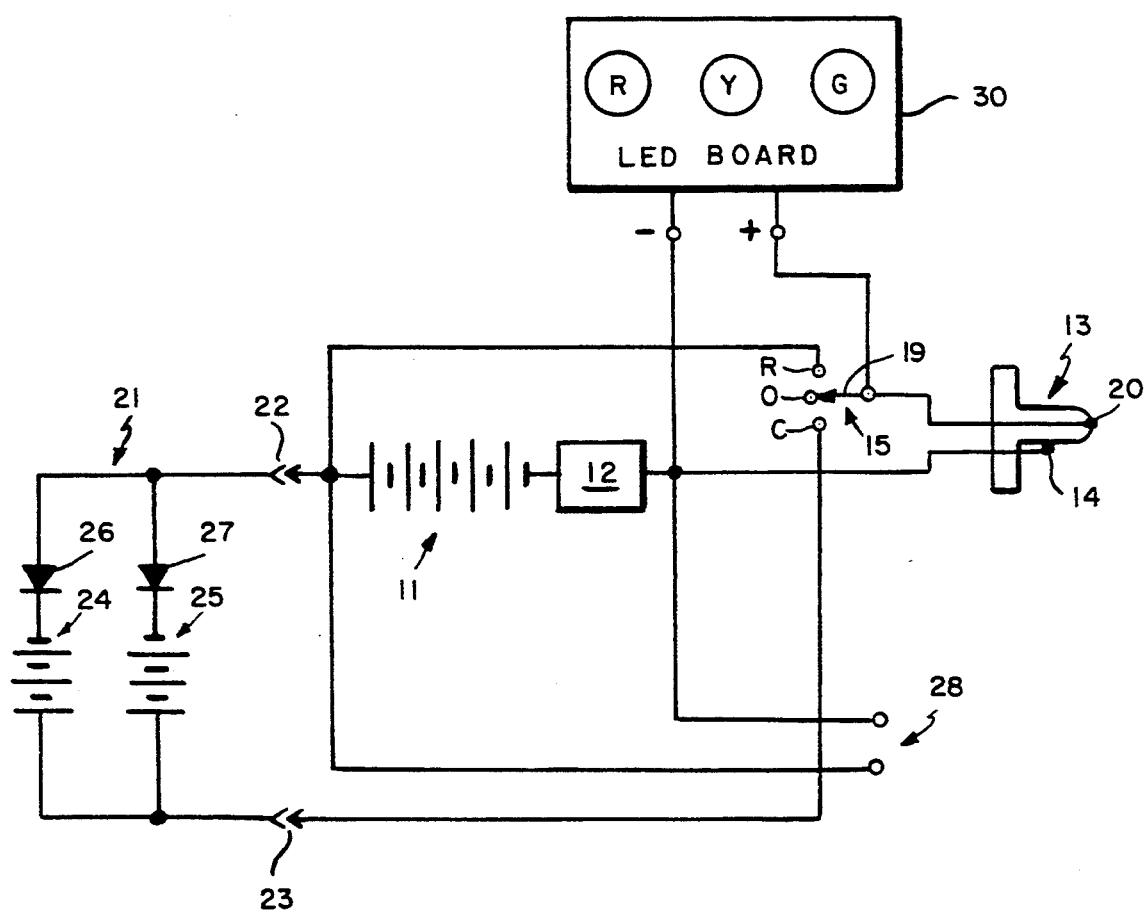

BATTERY CHARGING DEVICE

INTRODUCTION

This invention relates generally to a battery charging device, and, more particularly, to a self-contained emergency battery charger for use in motor vehicles for charging a fully or partially discharged starter storage battery which delivers current to a starter motor of the vehicle.

BACKGROUND OF THE INVENTION

A motor vehicle storage battery frequently falls into a state of discharge such that it cannot deliver sufficient current to the starter motor. Such discharge state occurs most commonly because of excessive current drain, insufficient charging time, or severe environmental conditions, for example.

To start a vehicle whose storage battery has been partially or completely discharged requires either by-passing the electrical starting system entirely or supplying the electrical starting system with an additional source of external electrical power. The former technique is generally accomplished by push-starting the vehicle and the latter technique by using jumper cables connected to a fully charged external power source in another vehicle. Push starting requires assistance in the form of a push vehicle or human muscle power. Additionally, only cars fitted with standard transmissions can be push started. Jump starting requires the aid of an additional vehicle. Further, cables must be available and must be externally connected, requiring the user to exit the vehicle, and be exposed to the hazards of weather or of a possible battery explosion and associated mishaps as a result of a misconnection of the cables.

Self-contained emergency charging means for charging a vehicle's inoperative battery to enable a vehicle to start have been proposed. For example, U.S. Pat. No. 4,004,208 issued to Tamminen discloses a starting aid which may be contained within a vehicle to provide an emergency power source. The starting aid described therein is not itself readily rechargeable and requires approximately fifteen hours to recharge itself with the vehicle's engine running, because only the additional voltage differential supplied by the vehicle's alternator or generator can be used to recharge the charging aid batteries. Because this voltage differential is very small, no fast charging mode is possible in the starting aid proposed by Tamminen.

U.S. Pat. No. 4,540,929 issued to Binkley also discloses a starting aid unit which is not readily rechargeable and uses a low current regulation system. The unit requires approximately 14 to 16 hours to recharge itself using either vehicle current or an external AC current source. Such long recharging time is needed because the voltage differential between the two battery packs used in the unit and the vehicle voltage source is high enough that the recharging of the battery packs needs to be regulated so as to occur at a much lower voltage in order to avoid overheating or overcharging the battery packs. Accordingly, no fast recharge mode is possible in the unit disclosed by Binkley. Also, due to the size and type of batteries used in the battery packs of the Binkley unit, no fast discharge mode is possible. Moreover, the capability of the Binkley device to recharge a severely discharged vehicle starting battery, i.e., one whose voltage is below 50% of its normal voltage, is highly questionable and seems unlikely.

Other devices proposed in the art include devices disclosed in U.S. Pat. No. 3,504,262 issued to Sada et al. and in U.S. Pat. No. 3,763,415 issued to Ownby. Such devices require either a connection to an external power source, or are insufficiently portable, or require extensive charging and/or recharging times.

Accordingly, it would be desirable to provide a battery charging device which can recharge a discharged storage battery in a relatively short time, e.g., in a minute or less, and whose battery sources are capable of being recharged in a relatively short time, e.g., in a half-hour or less. Such a device should be designed so as to be able to provide sufficient power to recharge in a relatively short time even a severely discharged storage battery, i.e., one whose voltage is below 50% of its rated voltage, as well as a storage battery which has in effect been fully discharged.

BRIEF SUMMARY OF THE INVENTION

A battery charging device, in accordance with the invention, utilizes a rechargeable primary battery source, such as a 12-volt lead acid battery source, which is connected in series to a secondary battery source which includes at least two parallel connected, non-rechargeable, battery sources, each of the latter comprising a plurality of batteries, such as a plurality of readily available and relatively inexpensive 1.5-volt zinc-carbide or alkali batteries, and an associated diode. The overall combination of such primary and secondary battery sources is connected to an adaptor cable via a three-way switch which provides suitable connections for placing the device in a charge state for charging a discharged vehicle storage battery, for placing the device in a recharge state for recharging the primary battery source of the device, and for placing the device in a non-operating or "off" state. Such device provides a nominal 16 volt overall battery source capable of delivering up to 7–10 amperes/second for recharging a discharged vehicle storage battery, the adaptor cable being capable of plugging into the vehicle's cigarette lighter receptacle for providing the battery recharging operation. The overall device can be made relatively compact, lightweight and portable for easily carrying the device in the vehicle readily at hand for emergency purposes.

DESCRIPTION OF THE INVENTION

The invention can be described in more detail with the help of the accompanying drawing wherein the sole figure depicts a circuit diagram of a preferred embodiment of the battery recharging device of the invention.

As can be seen in the figure a battery recharging device 10 includes a primary battery source 11, which in a specific embodiment is preferably a rechargeable 12 volt lead acid battery capable of delivering 7 ampere/-seconds for at least an hour. Such a battery source 11 is readily available, for example, from Union Battery Company of Chicago, Ill. under the model designation MX12070. The negative terminal thereof is connected via a fuse or circuit breaker 12 (e.g., having, for example, a 10 ampere value) to a negative electrode 14 of an output adaptor plug 13. The positive terminal of primary battery source 11 is connected to a recharge terminal "R" of a three-way switch 15. A movable switch element 19 of switch 15 is connected to the positive electrode 20 of adaptor plug 13.

A secondary battery source 21 is removably connected, via interconnections 22 and 23, so as to be in series with the primary battery source 11. In the embodiment depicted, secondary battery source 21 comprises two parallel connected circuits which include battery packs 24 and 25 connected at their negative terminals to corresponding diodes 26 and 27, respectively. The diodes are each connected to the positive terminal of primary battery source 11. The positive terminals of batteries 24 and 25 are connected to a charge terminal "C" of switch 15. Batteries 24 and 25 in the preferred embodiment depicted comprise three standard, and readily available, 1.5 volt zinc-carbide, or alkali, batteries, e.g., of the D-size variety, connected in series, as made and sold by many companies.

The center terminal "O" of switch 15 is an "Off" position terminal so that when movable terminal 19 is connected thereto no external charging or internal recharging operations, as discussed below, occur.

When the unit is being operated to recharge an external storage battery, e.g., a 12-volt vehicle starting storage battery, plug 13 is inserted into the cigarette lighter receptacle of the vehicle and movable element 19 of switch 15 is placed in the C, or charging, position. The primary and secondary battery sources 11 and 21 are thereupon placed in series, the 4.5-volt secondary battery source 21 effectively adding to the primary 12-volt battery source to provide a nominal charging voltage level of about 16 volts, there being a voltage drop of about a 0.5 to 0.6 volts across diodes 26 and 27. The 16 volts are delivered to the vehicle storage battery via plug connector 13 and the vehicle's internal wiring, the diodes preventing any backcharging of the cells of secondary battery source 21.

The primary lead acid battery source 11 is capable of delivering about 7 amperes/second for up to one hour and the secondary zinc-carbide, or alkali battery source 21 is capable of delivering up to 8 amperes/second, or more, for up to three hours. Although the non-rechargeable secondary battery source 21 periodically needs replacing, it will normally be usable for up to about 30 or more recharging operations before replacement is needed.

The rechargeable primary battery source 11 can be recharged by placing switch 15 in its recharge R position and inserting plug 13 into the cigarette lighter receptacle of a vehicle having a fully operating storage battery as a recharging source. Alternatively, an additional 12 volt input terminal 28 can be made available for connecting another suitable 12 volt, external recharging source across primary battery source 11 and circuit breaker 12 to recharge the primary battery source.

An available light emitting diode (LED) indicator board 30, such as made and sold by Radio Shack Division of Tandy Corporation of Fort Worth, Tex. under the Model designation 22-1635, can be used, such board having a positive and a negative terminal available as shown. The board has three different colored LED indicator lights to provide status indications to a user of the device. For example, the board may include red, green and yellow LEDs as shown. The positive terminal of board 30 is connected to the off position (O) of switch 15, while the negative terminal thereof is connected to the negative terminal of primary battery source 11 and of plug 13.

When plug 13 is inserted into a cigarette lighter receptacle to provide a connection to a vehicle's internal storage battery charging system and switch 15 is in its off position (O), the red LED will be activated if the storage battery is severely discharged, e.g., its voltage level is more than 50% below its rated voltage, while the yellow LED will be activated if the voltage level is below its 12 volt level but is not severely discharged. If the vehicle charge battery essentially fully charged, the green LED will be activated.

When it is desired to charge a discharged vehicle storage battery, and switch 15 is placed in its charge position (C), the red LED will be initially activated (indicating that the storage battery is discharged), the yellow LED will then be activated at first together with the red LED, and then later alone as the charging operation proceeds, and when the vehicle's storage battery becomes effectively fully charged, the green LED will be activated, at first together with the yellow LED and then alone. During a charging operation, the speed of the sequencing of the lights from red to yellow to green provides a reasonable indication to the user of the efficiency in time of the charging operation.

The same indicator lights can also be used to indicate the power remaining in the primary and secondary battery source when switch 15 placed in the internal recharge position (R) and the plug 12 is not connected to anything. A green LED indication shows the presence of adequate charging voltage in the primary and secondary battery sources of the device, a yellow LED indication shows that at least about one-half or more of the charging capacity of the device is available, and a red LED indication shows that the device has insufficient charging capacity available so that either primary battery source needs recharging or secondary battery source 21 needs replacement, or both. When plug 13 is connected to an external source and switch 15 is in the recharge (R) position to recharge the primary battery source, the LEDs then indicate the status of the recharging operation.

When switch 15 is in its off position (O) and plug 13 is inserted into the vehicle's cigarette lighter receptacle, the status light will indicate the status of the vehicle's internal charging system.

The components depicted in the circuit of the figure can be appropriately packaged to provide a compact, relatively light and easy-to-use device which can be readily stored inside a vehicle so that it is available for use when the vehicle's battery is discharged to a point when it cannot deliver sufficient current to the vehicle's starter motor. To recharge the vehicle's battery, the user need only insert plug 13 into the cigarette lighter receptacle without any need to get out of the vehicle itself. Moreover, by suitable placement of the three way switch in its various positions, the user can use the device to charge a discharged battery or to recharge the device's internal primary source. Moreover, the device can be used as a diagnostic tool to determine the charging status of the vehicle's storage battery and to determine the status of the charging device itself.

While the above embodiment represents a specific embodiment of the invention, modifications thereof may occur to those in the art within the spirit and scope of the invention. Hence, the invention is not to be construed as limited to the specific embodiment described, except as defined by the appended claims.

What is claimed is:

1. A battery charging device comprising
 a first low-amperage rechargeable battery source providing a first voltage output;

a second low-amperage non-rechargeable battery source circuit removably connected in series with said first battery source and providing a second voltage output, said first and second voltage outputs providing a charging voltage output;

switching means connected to said charging voltage output, said switching means having a first position for supplying said charging voltage output to an external battery which is to be charged, and a second position for supplying a recharging voltage from an external source to said device for recharging said first battery source.

2. A battery charging device in accordance with claim 1 and further including indicator means for indicating the charging status of the external battery which is to be charged when said switching means is in said first position and for indicating the status of the charging voltage output of said device when said switching means is in said second position.

3. A battery charging device in accordance with claim 1 where said first battery source is a rechargeable lead acid battery source.

4. A battery charging device in accordance with claim 1 when said second battery source circuit comprises at least two parallel-connected circuits each including a plurality of series-connected low-amperage non-rechargeable batteries and diode means connected in series with said non-rechargeable batteries for preventing back charging of said series-connected batteries.

5. A battery charging device in accordance with claim 4, wherein said first battery source is a rechargeable lead acid battery source and said series-connected batteries are zinc-carbide, or alkali, batteries.

6. A battery charging device in accordance with claim 5, wherein said lead acid battery source is a 12 volt battery source and each of said series-connected batteries comprise three 1.5 volt batteries whereby said charging voltage output is about 16 volts.

7. A battery charging device in accordance with claim 1 wherein said switching means further includes a third non-operative position.

8. A battery charging device in accordance with claim 2 wherein said indicator means includes three indicator lights each having a different color whereby when said switching means is in said first position, a first color indicates that the external battery which is to be charged has a voltage output which is less than about 50% of its fully charged voltage output, a second color indicates that the battery which is to be charged has a voltage output greater than about 50% of its fully charged voltage output but less than its fully charged voltage output, and a third color indicator that the battery which is to be charged has a substantially fully charged voltage output.

9. A battery charging device in accordance with claim 8 wherein when said switching means is in said second position, the first color indicates that the charging voltage output of said device is less than about 50% of its full charging voltage output, the second color indicates that the charging voltage output of said device is greater than about 50% of its charging voltage output but less than its full charging voltage output, and the third color indicator that the charging voltage output of said device is a substantially full charging voltage output.

10. A battery charging device in accordance with claim 1 and further including plug connector means connected to said switching means for connecting said device to an external battery which is to be charged.

11. A battery charging device in accordance with claim 10 wherein said battery to be charged is a storage battery in a vehicle, said vehicle having a cigarette lighter receptacle connected to charging system connections for said storage battery, said plug connector means being connectable to said receptacle for permitting said device to charge said storage battery when said switching means is in said first position.

12. A battery charging device in accordance with claim 11 wherein said plug connector means is connectable to the cigarette lighter receptacle of a vehicle having a substantially fully charged storage battery for permitting the rechargeable first battery source of said device to be recharged when said switching means is in said second position.

13. A battery charging device in accordance with claim 8 wherein said indicator lights are light emitting diodes.

* * * * *